US005872961A

United States Patent [19]

Sakuma

[11] Patent Number: 5,872,961

[45] Date of Patent: *Feb. 16, 1999

[54] MICROCOMPUTER ALLOWING EXTERNAL MONITORING OF INTERNAL RESOURCES

[75] Inventor: Hajime Sakuma, Tokyo, Japan

[73] Assignee: NEC Corporation, Tokyo, Japan

[ * ] Notice: The term of this patent shall not extend beyond the expiration date of Pat. No. 5,586,336.

[21] Appl. No.: 478,670

[22] Filed: Jun. 7, 1995

Related U.S. Application Data

[63] Continuation of Ser. No. 889,623, May 28, 1992, abandoned.

[30] Foreign Application Priority Data

May 29, 1991 [JP] Japan .................................... 3-124249

[51] Int. Cl.[6] ...................................................... G06F 11/34

[52] U.S. Cl. ............................................................ 395/568

[58] Field of Search .................................... 395/775, 410, 395/411, 412, 569, 568, 500

[56] References Cited

U.S. PATENT DOCUMENTS

| | | | |
|---|---|---|---|
| 4,004,278 | 1/1977 | Nagashima | 711/203 |
| 4,403,282 | 9/1983 | Holberger et al. | 395/842 |
| 4,447,876 | 5/1984 | Moore | 395/500 |
| 4,649,476 | 3/1987 | Sibigtroth | 711/202 |
| 4,788,638 | 11/1988 | Ogawa et al. | 395/894 |
| 4,841,475 | 6/1989 | Ishizuka | 395/849 |
| 4,868,784 | 9/1989 | Marshall et al. | 395/310 |
| 5,070,477 | 12/1991 | Latif et al. | 395/841 |
| 5,126,944 | 6/1992 | Sakuma et al. | 701/103 |
| 5,206,933 | 4/1993 | Farrell et al. | 395/200.8 |
| 5,241,630 | 8/1993 | Lattin et al. | 395/308 |
| 5,276,810 | 1/1994 | Kitamura et al. | 395/200.64 |
| 5,327,565 | 7/1994 | Sakuma | 395/733 |
| 5,454,092 | 9/1995 | Sibigtroth | 711/202 |
| 5,490,060 | 2/1996 | Malec et al. | 395/210 |
| 5,586,336 | 12/1996 | Nakamura et al. | 395/568 |

FOREIGN PATENT DOCUMENTS

| | | |
|---|---|---|
| 57-203161 | 12/1982 | Japan . |
| 64-028747 | 1/1989 | Japan . |
| 3-044781 | 2/1991 | Japan . |

*Primary Examiner*—Parshotam S. Lall
*Assistant Examiner*—Kenneth R. Coulter
*Attorney, Agent, or Firm*—Sughrue, Mion, Zinn, Macpeak & Seas, PLLC

[57] ABSTRACT

A microcomputer having a function for monitoring internal resources closed within the microcomputer without preventing an execution of the microcomputer. An address of a register within the microcomputer is determined in advance from the outside of the microcomputer, and at a coincident timing with the register address outputted onto an internal register address bus, data on an internal data bus are taken in and are outputted to the outside of the microcomputer via a serial interface. The information of the internal resources closed within the microcomputer can be obtained without stopping the execution of the microcomputer to enable avoiding of a runaway or trouble of a machine to be controlled by the microcomputer and to enable developing at a real time similar to an execution time.

14 Claims, 5 Drawing Sheets

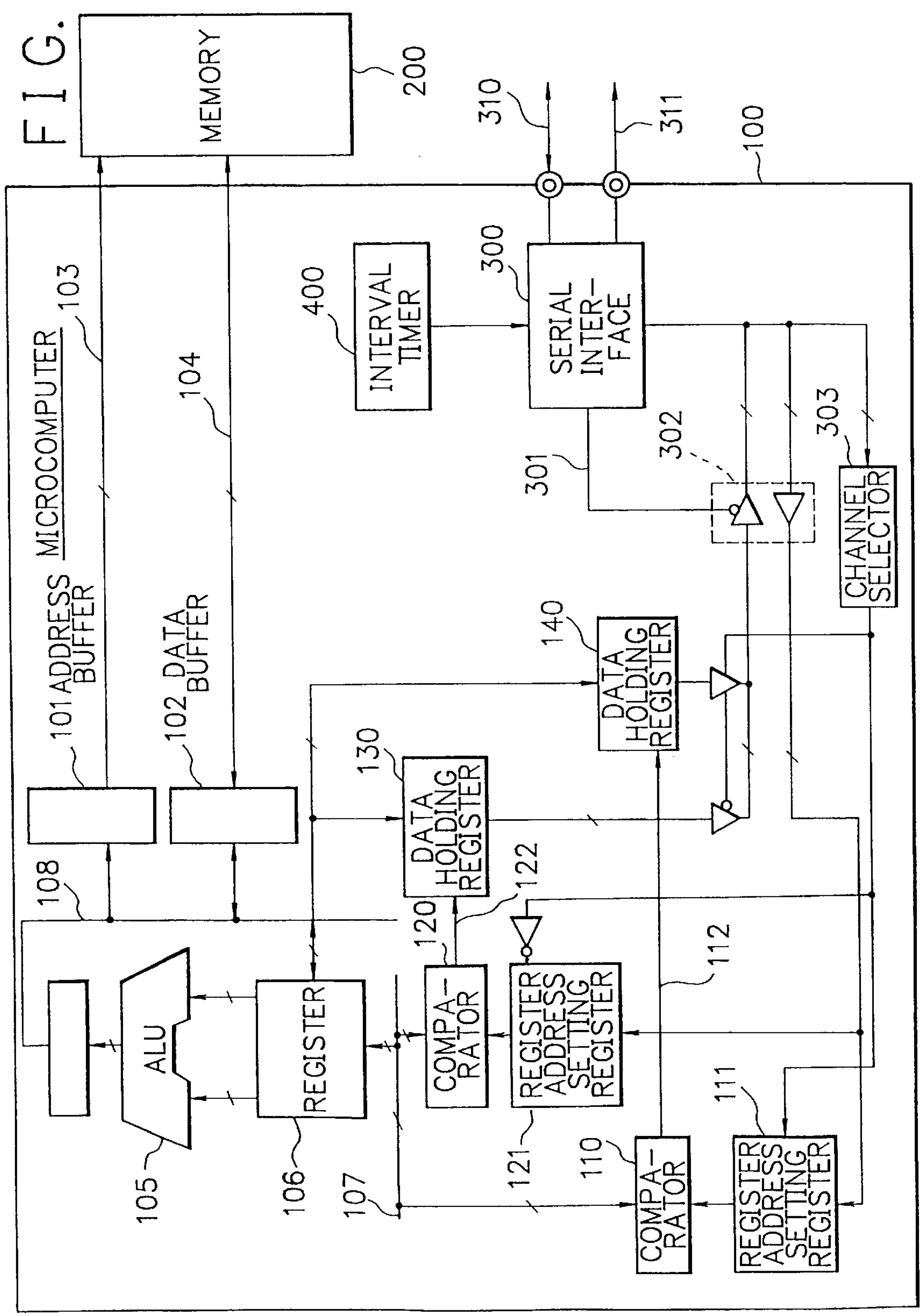
F I G. 2
MEMORY
200
MICROCOMPUTER
100
101 ADDRESS BUFFER
102 DATA BUFFER
103
104
105
ALU
REGISTER
106
107
108
COMPA-RATOR
110
111
112
REGISTER ADDRESS SETTING REGISTER
120
121
122
DATA HOLDING REGISTER
130
140
SERIAL INTER-FACE
300
301
302
303
CHANNEL SELECTOR
310
311
INTERVAL TIMER
400

MEMORY
MICROCOMPUTER
101 ADDRESS BUFFER
102 DATA BUFFER
ACTIVATE REQUEST F/F
ACTIVATE REQUEST F/F
SERIAL INTER-FACE
DATA HOLDING REGISTER
DATA HOLDING REGISTER
CHANNEL SELECTOR
ALU
REGISTER
COMPA-RATOR
REGISTER ADDRESS SETTING REGISTER
COMPA-RATOR
REGISTER ADDRESS SETTING REGISTER
100
103
104
105
106
107
108
110
111
112
113
120
121
122
123
130
140
200
300
301
302
303
310
311
312

MICROCOMPUTER ALLOWING EXTERNAL MONITORING OF INTERNAL RESOURCES

This is a Continuation of application Ser. No. 07/889,623 now abandoned filed May 28, 1992.

BACKGROUND OF THE INVENTION

The present invention relates to a microcomputer, and more particularly to a microcomputer having a function for monitoring internal resources of the microcomputer from the outside thereof.

DESCRIPTION OF THE PRIOR ART

In FIG. 1, there is shown a microcomputer 100 and a memory 200 connected thereto via an address bus 103 and a data bus 104. The microcomputer 100 with a CPU comprises an ALU (arithmetic-logic unit) 105, a register 106 including a plurality of registers, an instruction register 150, a register address generation circuit 151, an address buffer 101, and a data buffer 102, and further includes an internal data bus 108, a register address bus 107, and the like for connecting the aforementioned members.

Usually, a microcomputer also includes a temporary register, a microprogram ROM, peripheral circuits, and other various random logics, and further includes a ROM, a RAM, and the like, if necessary. For the purposes of this specification, these hardware items are secondary and thus the description thereof is omitted for brevity.

The microcomputer has a variety of internally stored instructions such as an inter-register transfer instruction, an inter-register arithmetic instruction, an inter-memory and inter-register transfer instruction, an arithmetic instruction, a branch instruction, and the like. The operations of the typical instructions are briefly described as follows.

In case of the inter-register arithmetic instruction, an objective register address selected from register designation information stored in the instruction register 150 is outputted to the register address bus 107 by the register address generation circuit 151. The objective register address is read out of the register 106 and, after performing a predetermined operation in the ALU 105, is written back in a predetermined register within the register 106 via the internal data bus 108.

In the case of the inter-register transfer instruction, a predetermined memory address is formed from memory address information stored in the instruction register 150. (Usually, a memory address is formed by an operation such as an addition or the like by using the ALU 105. However, this is not directly concerned with the present invention, and thus the detailed description can be omitted.) The formed memory address is stored in the address buffer 101 via the internal data bus 108. This memory address is outputted to the external memory 200 via the address bus 103. Data read out of the memory 200 are stored in the data buffer 102 via the data bus 104. Next, when the data are written back into the register, an objective register address selected from the register designation information stored in the instruction register 150 is outputted to the register address bus 107 by the register address generation circuit 151, and at the same time, the contents of the data buffer 102 are stored in a predetermined register within the register 106 via the internal data bus 108.

Although the operations of the two typical instructions are briefly described, an important consideration is whether or not the data to be operated on during the execution of the instruction are outputted to the outside of the microcomputer 100. In the case of an operation between the register and the memory 200, the address in the memory 200 is outputted via the address bus 103, and the contents of the memory 200 is outputted via the data bus 104. Hence, by monitoring the address bus 103 and the data bus 104 outside the microcomputer 100 (usually, a read or write strobe signal is also often monitored, but the detailed description thereof is omitted), the address and the data can be detected without halting the operation of the microcomputer 100, and thus the state of the execution can be observed from the outside of the microcomputer 100.

On the other hand, in case of the operation between the registers in the microcomputer 100, as described above, the information is outputted only via the internal data bus 108 and the register address bus 107 within the microcomputer 100, and hence it can not be known from the outside of the microcomputer 100 what processing is being performed inside the microcomputer 100.

As described above, in the case of an instruction for operating the register or in the case of an operation of a resource closed within the microcomputer 100, for example, an operation of an internal RAM when this RAM (description omitted) is present within the microcomputer 100, the information is not outputted to the outside.

During program development using the microcomputer, it is frequently necessary to refer to this kind of closed information. In order to realize this, the execution of the microcomputer is stopped, and an instruction for outputting the information from the internal resource to the outside is executed to obtain the necessary information at the outside of the microcomputer.

However, in the case of an application to control a machine by using the microcomputer, when the execution of the microcomputer is stopped, a runaway condition or other trouble with the machine being controlled may be caused. Further, when the execution of the microcomputer is stopped, a difference between the execution times of the program during development and during actual use is caused, so that it is impossible to perform program developing in real time. Hence, when running such an application, there is no means for obtaining the information of the closed resource within the microcomputer, and thus program development is very difficult.

SUMMARY OF THE INVENTION

It is therefore an object of the present invention to provide a microcomputer capable of monitoring internal resources within the microcomputer from the outside thereof without preventing ordinary operation of the microcomputer and without stopping execution of the microcomputer.

In accordance with one aspect of the present invention, there is provided a microcomputer including a CPU and a plurality of internal resources on a single semiconductor substrate, comprising holding means for taking in contents of one of the internal resources closed within the microcomputer at a predetermined timing (i.e., receiving the contents at a desired time or at desired time intervals), and output means for outputting contents of the holding means to the outside of the microcomputer at a predetermined timing (i.e., outputting the contents at a desired time or at desired time intervals), the output means outputting the contents of the holding means to the outside of the microcomputer without significantly affecting the microcomputer's operation.

The holding means can include a plurality of second holding means, and further comprises discrimination means for discriminating any of a plurality of the second holding means.

The internal resource can include a plurality of registers.

The microcomputer can include a plurality of register address setting means for setting addresses of a plurality of registers in advance; and a plurality of comparison means for comparing register addresses stored in the register address setting means with register addresses passing through an address bus for addressing the registers within the microcomputer, the second holding means taking in data passing through a data bus within the microcomputer in synchronism with a coincident timing of the comparison means.

The output means can include a serial interface. After the serial interface outputs a predetermined number of data from the second holding means to the outside of the microcomputer in an output mode, the serial interface is switched to an input mode and inputs discrimination data for discriminating the internal resources from the outside of the microcomputer.

The serial interface can output the contents of the second holding means to the outside of the microcomputer in synchronism with a clock signal and can input the discrimination data for discriminating the internal resources from the outside of the microcomputer.

The discrimination data for discriminating the internal resources include register addresses and channel numbers for exhibiting a plurality of groups, each group being formed by the register address setting means, the comparison means, and the second holding means. The serial interface inputs the channel numbers and the register addresses in the input mode.

The discrimination means can be a channel selector for selecting the register address setting means by the channel numbers.

The microcomputer can also include an interval timer for initiating the interface.

The microcomputer can further include activate request flip-flop circuit means set by a coincidence signal fed from the comparison means; and input port means for inputting an activate request then input mode. The serial interface outputs the data according to the activate request fed from the activate request flip-flop circuit means and inputs the discrimination data according to the activate request fed from the input port means.

BRIEF DESCRIPTION OF THE DRAWINGS

The objects, features and advantages of the present invention will become more apparent from the consideration of the following detailed description, taken in conjunction with the accompanying drawings, in which:

FIG. 2 is a block diagram of a first embodiment of a microcomputer according to the present invention;

DESCRIPTION OF THE PREFERRED EMBODIMENTS

Figure 1:
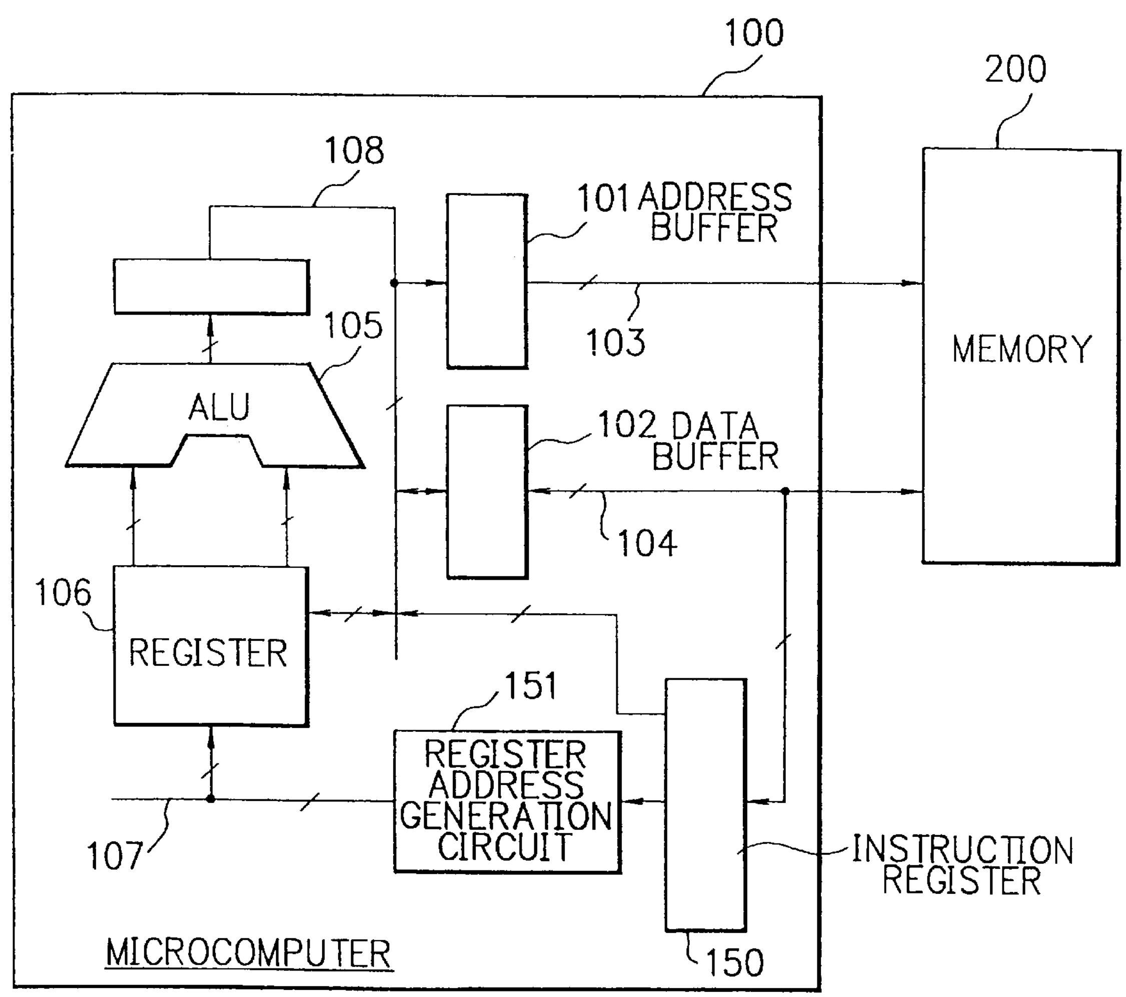
FIG. 1 is a block diagram of a conventional microcomputer.

Referring now to the drawings, wherein like reference characters designate like or corresponding parts throughout the views and thus the repeated description thereof can be omitted for brevity, a description will be given in detail of a microcomputer according to the present invention.

Figure 3:
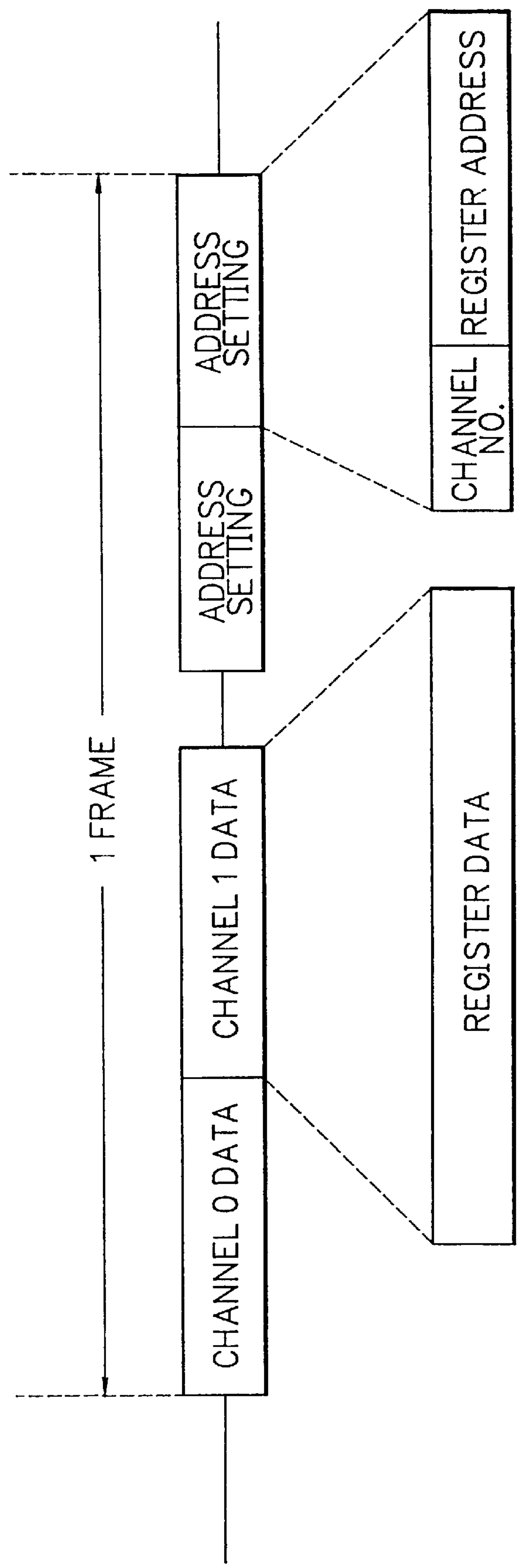
FIG. 3 is a schematic diagram showing a protocol of a serial interface used in the microcomputer shown in FIG. 2.

The first embodiment of a microcomputer according to the present invention will now be described in connection with FIGS. 2 and 3.

In FIG. 2, there is shown the first embodiment of the microcomputer according to the present invention. As shown in FIG. 2, the microcomputer 100 and a memory 200 are connected each other by an address bus 103 and a data bus 104. The microcomputer 100 with a CPU comprises an ALU 105, a register 106 including a plurality of registers, an address buffer 101 and a data buffer 102, and further comprises an internal data bus 108, a register address bus 107, and the like for connecting the aforementioned members.

Further, like the conventional microcomputer, this embodiment also includes a temporary register, a microprogram ROM, peripheral circuits and other various random logics, and further includes a ROM, a RAM and the like, if necessary. The description of these is omitted for brevity. Further, although the instruction register and the register address generation circuit are provided in the conventional microcomputer, the microcomputer 100 also includes an instruction register and a register address generation circuit having the same constructions and functions as those of the conventional microcomputer, and thus the description and illustration in FIG. 2 of these members is omitted for brevity.

In this embodiment, the microcomputer 100 further includes comparators 110 and 120, register address setting registers 111 and 121, data holding registers 130 and 140, an interval timer 400, a serial interface 300, a bus arbiter 302, and a channel selector 303. A coincidence signal 112 is outputted from comparator 110 to data holding register 140, and similarly a coincidence signal 122 is output from comparator 120 to data holding register 130. The serial interface 300 controls a bus switching signal 301. The serial interface 300 is connected to a device (not shown) positioned outside of the microcomputer 100 via a serial bus 310 and a serial clock signal wire 311. The microcomputer includes the CPU and a plurality of internal resources on a single semiconductor substrate.

In this instance, comparator 110, register address setting register 111, and data holding register 140 are dealt with as one group, hereinafter referred to as channel 0. Similarly, comparator 120, register address setting register 121, and data holding register 130 are dealt with as another group hereinafter referred to as channel 1.

In this embodiment, the serial interface 300 receives an activate request at a predetermined interval from the interval timer 400 within the microcomputer 100 and executes an input or an output of a series of serial data in synchonism with the serial clock signal wire 311 via the serial bus 310. A unit of a serial transmission or reception at one activation is called one frame, and a structure of one frame is shown in FIG. 3.

One frame comprises a former half for output mode and a latter half for input mode. Using the former half of the frame, the serial interface 300 outputs data of channel 0 and channel 1. When channel 0 is selected, the content of data holding register 140 is outputted, and, when the channel 1 is selected, the content of data holding register 130 is outputted.

After the information of both channels is outputted, the serial interface 300 is switched to the input mode, and using the latter half of the frame, new address information is inputted to the microcomputer 100 via the serial interface 300. The address setting information comprises a channel number and a register address. In this embodiment, for example since only channels 0 and 1 are used, channels 0 and 1 correspond to 0 and 1, respectively. The register address corresponds to only one of a plurality of registers within the microcomputer 100 to be monitored.

At the first initiation time by the activate request from the interval timer 400 for carrying out the transmission or receiption of data at the above-described protocol, since the setting of the register address from the outside of the microcomputer 100 is not performed yet, the output data are dummy data.

Since the first received information is channel information, the serial interface 300 receiving the address setting data transfers his channel information to the channel selector 303. With a channel 0 designations, for example, the channel selector 303 enables register address setting register 111. Then, when the register address is received, the serial interface 300 makes the bus switching signal 301 active to allow the data bus to connect to register address setting register 111 or 121 from the serial interface side, and outputs the register address. Since register address setting register 111 is enabled by the channel 0 designation, the register address is stored in register address setting register 111. Similarly, with a channel 1 designation, register address setting register 121 is enabled, and the register address is stored therein.

During execution of the microcomputer 100, with every access of register 106 within the microcomputer 100, the address of the object register is outputted via the register address bus 107. Comparator 110 always compares the register address output via the register address bus 107 with contents of the register address setting register 111, and, when the two values are coincident comparator 110 outputs coincidence signal 112 to data holding register 140. When the register address is outputted via the register address bus 107, since in case of the writing process to the register, the write data are outputted onto the internal data bus 108, the write data outputted via the internal data bus 108 during a writing process to the register data holding register 140 at the occurrence of coincidence signal 112.

In case of channel 1, the write data on the internal data bus 108 enter data holding register 130 at the occurrence of coincidence signal 122 in the same manner as for channel 0, as described above.

When the serial interface 300 is initiated by the activate signal output from the interval timer 400, the serial interface 300 makes the bus switching signal 301 inactive to switch the bus arbiter 302 so as to connect the data holding registers 130 and 140 with the serial interface 300.

Then, the register data of channel 0 are read out of data holding register 140 and are outputted to outside the microcomputer 100 via the serial bus 310 in synchronism with the serial clock on the serial clock signal wire 311. Next, the register data of channel 1 are read out of data holding register 130 and are outputted to outside the microcomputer 100 via the serial bus 310 in synchronism with the serial clock on the serial clock signal wire 311.

When the outputting of the register data of channels 0 and 1 is completed, serial interface 300 switches the serial bus 310 to the input mode, and awaits a new register address setting input from outside the microcomputer 100. Then, the register address setting is executed at the above-described protocol.

In this embodiment, although the case of only two channels 0 and 1 has been described, it is readily understood that it is possible to readily increase the number of channels by adding to the channel selector 303 and adding further hardware.

The second embodiment of a microcomputer according to the present invention will now be described in connection with FIGS. 4 and 5.

Figure 4:
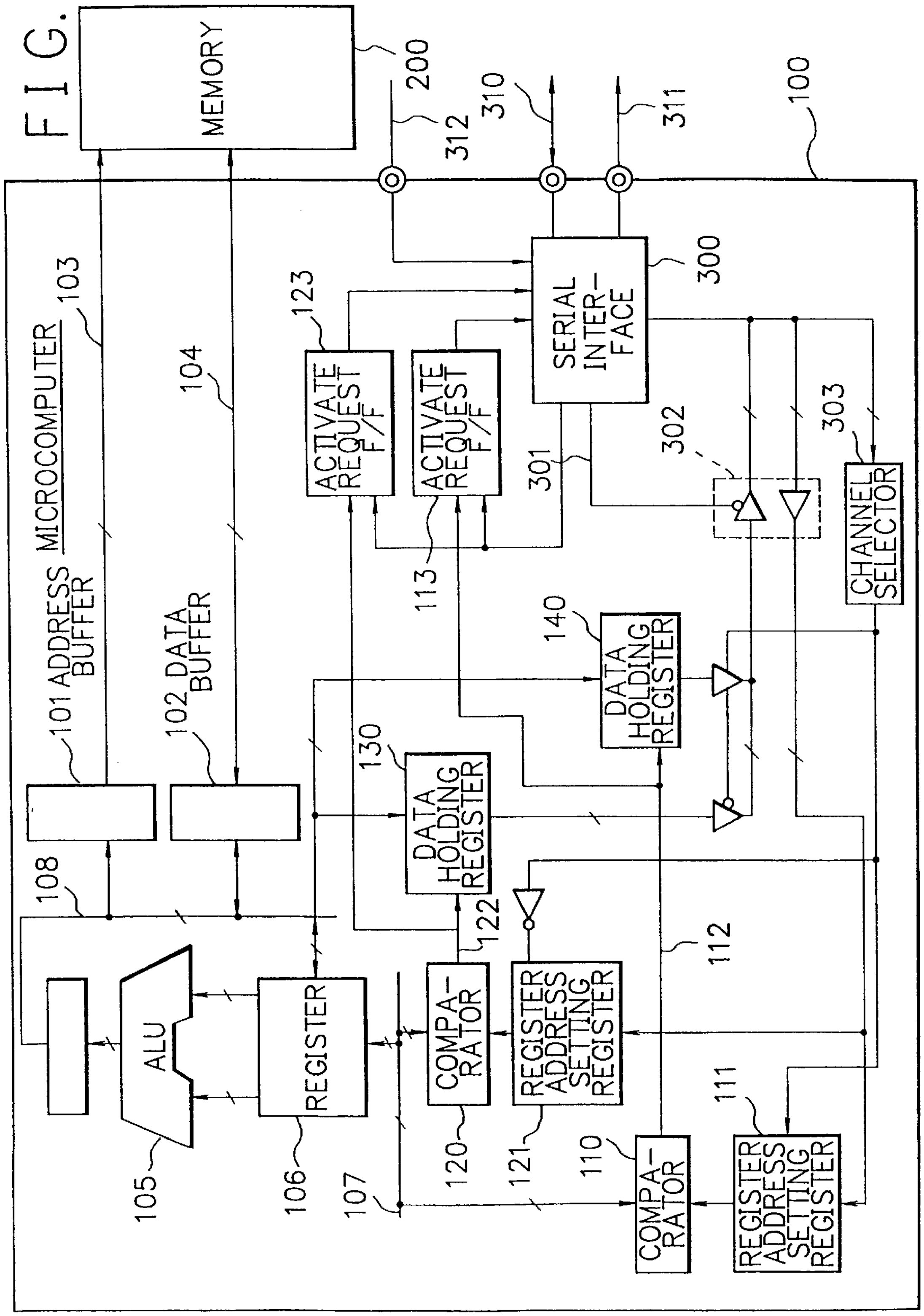
FIG. 4 is a block diagram of a second embodiment of a microcomputer according to the present invention.
Figure 5:
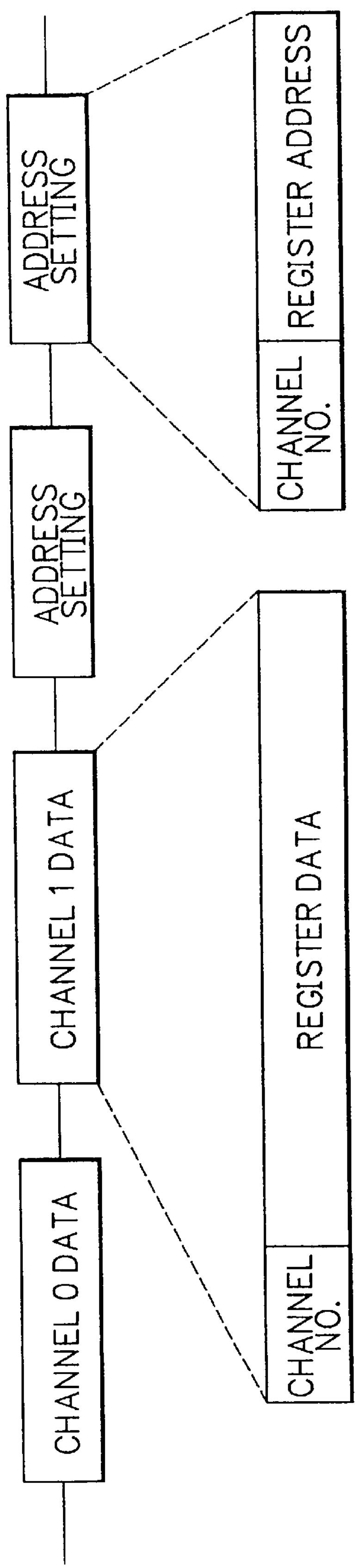
FIG. 5 is a schematic diagram showing a protocol of a serial interface used in the microcomputer shown in FIG. 4.

In FIG. 4, there is shown the second embodiment of the microcomputer according to the present invention, having the same construction as the first embodiment shown in FIG. 2, except that an activate request F/F (flip-flop circuit) 113 set by coincidence signal 112, an activate request F/F 123 set by coincidence signal 122, and an input port 312 for receiving an activate request signal to be fed to the serial interface 300 from outside the microcomputer 100 are further provided, while the interval timer 400 within the microcomputer 100 of the first embodiment is omitted.

In this embodiment, the serial interface 300 receives an initiation of serial data outputted from activate request F/F 113 and activate request F/F 123, and outputs a series of serial data to outside of the microcomputer 100 via the serial bus 310 in synchronism with the serial clock on the serial clock signal wire 311. Structure of an input and output protocol used with this embodiment is shown in FIG. 5.

In this case, the concept of the frame is not different from the first embodiment described above. When the serial interface 300 is initiated by either activate request F/F 113 or 123, the serial interface 300 operates in the output mode. When the serial interface 300 is initiated by the activate request input through the input port 312, the serial interface 300 operates in the input mode.

In the output mode, the channel data comprise the discrimination data representing channel 0 and the contents of data holding register 140 in channel 0, or the discrimination data representing channel 1 and the contents of data holding register 130 in channel 1.

When the activate request for the input mode is given to the serial interface 300 via the input port 312, the new address setting information is inputted from outside the microcomputer 100. The address setting information comprises a channel number and a register address in the same manner as in the first embodiment.

The operation of the serial interface 300 receiving the address setting data is performed in the same manner as in the first embodiment.

During execution of the microcomputer 100, entry of register data in the data holding registers 130 and 140 is carried out in the same manner as the first embodiment.

When the serial interface 300 is activated by either activate request F/F 113 or 123 set at upon output of coincidence signal 112 or 122, the serial interface 300 makes the bus switching signal 301 inactive to switch the bus arbiter 302 so as to connect the data holding registers 130 and 140 with the serial interface 300.

Then, when activate request F/F 113 is active, the register data of channel 0 are read out of data holding register 140 and are outputted to outside the microcomputer 100 via the serial bus 310 in synchronism with the serial clock signal on the serial clock signal wire 311. After the outputting is completed, activate request F/F 113 is reset.

Likewise, when activate request F/F 123 is active, the register data of channel 1 are read out of data holding register 130 and are outputted to outside the microcomputer 100 via the serial bus 310 in synchronism with the serial clock signal on the serial clock signal wire 311. After the outputting is completed, activate request F/F 123 is reset.

Although, a microcomputer having a register as an internal resource and using a serial interface as the input and output interface has been explained, a microcomputer may have a RAM, ROM, a peripheral hardware or the like as the internal resource. Furthermore, a microcomputer using a parallel bus or the like as the input and output interfaces, can also be implemented in the same manner as described above. In addition, although the serial interface has been explained as a clock synchronization type, it can be also implemented by using a different protocol such as a UART format or the like in the same manner as described above.

As described above, the address of the register within the microcomputer 100 is previously determined from outside the microcomputer 100, and at a time coincident with the register address output via the register address bus 107, the data on the internal data bus 108 are taken in and are outputted to outside the microcomputer 100 via the serial interface 300. Hence, the information of the closed resource within the microcomputer 100 can be outputted to the outside thereof without stopping or preventing normal operation of the microcomputer 100.

By using the above-described method, in the case of an application for controlling a machine by using the microcomputer, the information of the closed resource within the microcomputer can be obtained without stopping execution of the microcomputer, and thus a runaway situation or other trouble with the machine being controlled can be avoided. Further, since execution of the microcomputer is not stopped, real-time program or system development is possible.

Further, by using a RAM, a ROM, peripheral hardware or the like as an internal resource within the microcomputer and a parallel bus or the like as the input and output interface, the same effects and advantages as those obtained according to the present invention can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A microcomputer including a CPU and a plurality of internal data resources on a single semiconductor substrate, comprising:

first holding means for receiving and storing information concerning one of said plurality of internal data resources within the microcomputer during a predetermined interval of time, wherein said information is received by and stored in said first holding means without stopping or disturbing program execution by the microcomputer;

output means for outputting from the microcomputer at a predetermined time, the information stored by the first holding means, without stopping or disturbing said program execution by the microcomputer;

a second holding means for receiving and storing information concerning said one of said plurality of internal data resources or another of said plurality of internal data resources within the microcomputer, wherein the output means includes a serial interface, and wherein, after the serial interface outputs the information from either said first or second holding means to outside the microcomputer in an output mode, the serial interface is switched to an input mode and inputs discrimination data for selecting among said plurality of internal data resources from outside the microcomputer.

2. The microcomputer as claimed in claim 1, wherein:

the serial interface outputs the information from either said first or second holding means to outside the microcomputer in synchronism with a clock signal, and inputs the discrimination data from outside the microcomputer to select among said plurality of internal data resources.

3. A microcomputer including a CPU and a plurality of internal data resources on a single semiconductor substrate, comprising:

first holding means for receiving and storing information concerning one of said plurality of internal data resources within the microcomputer during a predetermined interval of time, wherein said information is received by and stored in said first holding means without stopping or disturbing program execution by the microcomputer;

output means for outputting from the microcomputer at a predetermined time, the information stored by the first holding means, without stopping or disturbing said program execution by the microcomputer;

a second holding means for receiving and storing information concerning said one of said plurality of internal data resources or another of said plurality of internal data resources within the microcomputer, wherein said first holding means comprises a first data holding means and said second holding means comprises a second data holding means;

discrimination means for selecting between said first holding means and said second holding means, wherein said plurality of internal data resources comprises a plurality of internal registers, wherein said first holding means further comprises:

a first register address setting means for setting and storing an address of one of said plurality of internal registers as a first register address; and a first comparison means for comparing the first register address stored in the first register address setting means with internal register addresses obtained from an address bus, wherein said address bus respectively contains addresses of said plurality of internal registers within the microcomputer and wherein the first data holding means functions so as to take in data obtained from an internal data bus in synchronism with the first comparison means;

wherein said second holding means further comprises:

a second register address setting means for setting and storing an address of said one of said plurality of internal registers or of another of said plurality of internal registers as a second register address; and a second comparison means for comparing the second register address stored in the second register address setting means with said internal register addresses obtained from said address bus, wherein the second data holding means functions so as to take in data from said internal data bus in synchronism with the second comparison means.

4. The microcomputer as claimed in claim 3, wherein the output means includes a serial interface.

5. The microcomputer as claimed in claim 4, wherein:

after the serial interface outputs the information from either said first or second data holding means to outside the microcomputer in an output mode, said serial interface is switched to an input mode and inputs discrimination data for selecting among said plurality of internal data resources from outside the microcomputer.

6. The microcomputer as claimed in claim 5, wherein:

the serial interface outputs the information from either said first or second data holding means to outside the microcomputer in synchronism with a clock signal, and inputs the discrimination data from outside the microcomputer to select among said plurality of internal data resources.

7. The microcomputer as claimed in claim 5, wherein the discrimination data include channel numbers for selecting from among a plurality of holding means, wherein said plurality of holding means includes said first holding means and said second holding means, wherein each of said plurality of holding means comprises a respective register address setting means, a respective comparison means, and a respective data holding means wherein the discrimination data include input register addresses and said plurality of holding means respectively receives said input register addresses; and wherein the channel numbers and the input register addresses are input in said input mode via said serial interface.

8. The microcomputer as claimed in claim 7, wherein the discrimination means is a channel selector for selecting from among said plurality of register address setting means according to said channel numbers.

9. The microcomputer as claimed in claim 4, further comprising an interval timer for initiating the serial interface.

10. The microcomputer as claimed in claim 4, further comprising:

activate request flip-flop circuit means, set by a coincidence signal fed from either the first or second comparison means, for producing a first activate request signal; and input port means for producing a second activate request signal to activate said input mode, wherein the serial interface outputs the information in response to the first activate request signal, and inputs discrimination data according to the second activate request signal.

11. The microcomputer as claimed in claim 3, wherein said output means outputs, from said microcomputer, said information concerning said one of said plurality of internal data resources or another of said plurality of internal data resources which is stored in said second holding means at a predetermined time without stopping or disturbing said program execution by the microcomputer.

12. A microcomputer including a CPU and a plurality of internal data resources on a single semiconductor substrate, comprising:

first holding means for receiving and storing information concerning one of said plurality of internal data resources within the microcomputer during a predetermined interval of time, wherein said information is received by and stored in said first holding means without stopping or disturbing program execution by the microcomputer; and output means for outputting from the microcomputer at a predetermined time, the information stored by the first holding means, without stopping or disturbing said program execution by the microcomputer, wherein said first holding means further comprises:

a first resource address setting means for setting and storing an address of one of said plurality of internal data resources as a first resource address; and a first comparison means for comparing the first resource address stored in the first resource address setting means with internal resources addresses obtained from an address bus, wherein said address bus respectively contains addresses of said plurality of internal data resources within the microcomputer and wherein the first data holding means functions so as to take in data obtained from an internal data bus in synchronism with output from the first comparison means.

13. A microcomputer including a CPU and a plurality of internal data resources on a single semiconductor substrate, comprising:

first holding means for receiving and storing information concerning one of said plurality of internal data resources within the microcomputer during a predetermined interval of time, wherein said information is received by and stored in said first holding means without stopping or disturbing program execution by the microcomputer; and output means for outputting from the microcomputer at a predetermined time, the information stored by the first holding means, without stopping or disturbing said program execution by the microcomputer, wherein said first holding means inputs identifying data which identifies said one of said plurality of internal data resources and stores said information based on said identifying data, wherein said identifying data corresponds to an address of said one of said plurality of internal data resources, wherein said CPU addresses said one of said plurality of internal data resources by outputting address data on an internal address bus, and wherein said first holding means makes a determination regarding whether or not said one of said plurality of internal data resources is addressed based on a relationship between said address data and said identifying data and stores said information based on said determination.

14. The microcomputer as claimed in claim 13, wherein said first holding means stores said information when said identifying data equals said address data.

* * * * *